United States Patent [19]

Wilcox

[11] Patent Number: 5,496,389
[45] Date of Patent: Mar. 5, 1996

[54] CLEAN AIR FAN FILTER MODULE

[75] Inventor: Wayne Wilcox, Nepean, Canada

[73] Assignee: Microzone Corporation, Canada

[21] Appl. No.: 257,579

[22] Filed: Jun. 9, 1994

Related U.S. Application Data

[63] Continuation of Ser. No. 67,986, May 27, 1993, abandoned.

[30] Foreign Application Priority Data

Apr. 8, 1993 [CA] Canada ................................. 2093692

[51] Int. Cl.$^6$ ................................. B01D 35/30
[52] U.S. Cl. ................................. 55/473; 55/495
[58] Field of Search ................................. 55/337, 385.2, 55/473, 474, 472, 493, 495, 497, 500, 502, 521

[56] References Cited

U.S. PATENT DOCUMENTS

| | | | |
|---|---|---|---|
| 4,088,463 | 5/1978 | Smith | 55/385.2 X |
| 4,178,159 | 12/1979 | Feeteau | 55/473 X |
| 4,319,899 | 3/1982 | Marsh | 55/416 |
| 4,344,784 | 8/1982 | Deckas et al. | 55/473 |
| 4,560,395 | 12/1985 | Davis | 55/276 |
| 5,053,065 | 10/1991 | Govay et al. | 55/385.2 X |
| 5,059,218 | 10/1991 | Pick | 55/493 X |
| 5,167,681 | 12/1992 | O'Keefe et al. | 55/385.2 |

FOREIGN PATENT DOCUMENTS

| | | |
|---|---|---|
| 943873 | 3/1974 | Canada . |
| 1035192 | 7/1978 | Canada . |
| 1252742 | 4/1989 | Canada . |
| 1294169 | 1/1992 | Canada . |
| 615359 | 7/1935 | Germany . |
| 2925845 | 1/1980 | Germany . |

Primary Examiner—Richard L. Chiesa

[57] ABSTRACT

A clean air fan filter module including a fan shroud, a fan/motor mount, a centrifugal fan, a fan motor, and a HEPA filter, the fan shroud having an air inlet and two inclined ends, the fan/motor mounted below the air inlet on the fan/motor mount, the centrifugal fan blowing air radially towards the fan shroud, the HEPA filter constituting the air outlet.

15 Claims, 5 Drawing Sheets

CLEAN AIR FAN FILTER MODULE

This application is a continuation of application Ser. No. 08/067,986, filed May 27, 1993, now abandoned.

The present invention relates to a clean air fan filter module to provide clean air and a uniform airflow in clean room ceiling systems, sterile suite ceiling systems, laminar flow equipment, and modular or mobile softwall clean air units.

The clean air fan filter module is comprised of a centrifugal fan, a fan shroud having a top and sides, an air inlet in the fan shroud, a fan mount fastened to the fan shroud, and a high efficiency particulate air (HEPA) filter providing a clean air outlet through said filter. The HEPA filter is fastened to the perimeter of the base of the fan shroud.

Existing clean air fan filter modules utilizing centrifugal fans blowing air radially outwardly utilize baffles between the fan and high efficiency particulate air (HEPA) filter assembly in order to obtain a uniform airflow through the HEPA filter air outlet. The applicant herein has found that by utilizing a fan shroud with two inclined ends and without a baffle between the centrifugal fan blowing air radially outwardly and the HEPA filter assembly does produce a uniform flow of clean air through the HEPA filter.

The clean air fan filter module of this invention is comprised of a novel fan mount assembly, in which the exterior portion of the mount is fastened to both sides of the fan shroud. The fan mount itself is comprised of a narrow thin plate whose length is the same as the width of the shroud assembly.

In another embodiment of the invention the clean air fan filter module is comprised of a fan shroud assembly, a fan mount assembly, a centrifugal fan, a fan motor, and a HEPA filter, the fan shroud assembly having an air inlet and two curved ends with curves extending downwardly through substantially ninety degrees, the fan/motor mounted on the fan/motor mount assembly below the air inlet, the centrifugal fan blowing air radially towards the shroud, the HEPA filter constituting the air outlet.

In another embodiment of the invention the top ends of the fan shroud assembly are curved to direct air flow downwardly.

In another embodiment of the invention the air inlet is disposed in the top of the fan shroud assembly.

In another embodiment of the invention the top of the fan shroud assembly has offset ribs, an air inlet ring and a pre-filter, the offset ribs having four sides extending about the air inlet, the top of said ribs adapted to receive and support the pre-filter, the top of said air inlet ring having horizontal flanges which sit on the fan shroud assembly, the interior of the inlet ring having vertical walls extending through the air inlet, the air inlet ring being moveable relative to the air inlet such that the air inlet ring may be aligned over the centrifugal fan inlet.

In another aspect of the invention the fan shroud assembly is vacuum formed.

In another embodiment of the invention the HEPA filter is comprised of side walls, HEPA filter media within said side walls and a protective screen below the filter media.

The HEPA filter assembly is comprised of pieces cut from a single aluminum extrusion. The extrusion includes an exterior upper lip for fastening the HEPA filter assembly to the base of the shroud assembly. The aluminum extrusion also includes on its exterior a square slot which is adapted to receive a fastener in order to fasten the HEPA filter assembly to a ceiling system, the frame of a work station, the frame of a mobile softwall clean air unit or for suspending the clean air fan filter module. The extrusion also includes a series of rectangular slots which are adapted to receive corner joining clips insertable into the rectangular slots in adjoining pieces of extrusion to form the exterior walls of the HEPA filter assembly.

The exterior lip at the top of the extrusions formed into the walls of the HEPA filter and the exterior lip of the base of the fan shroud assembly are designed to meet face to face and to be fastened together using vinyl fastening channel with mitered corners.

Another aspect of the invention relates to the method of manufacture of the HEPA filter module of the clean air fan filter module comprising cutting two pieces of extrusion to equal lengths with 45° cuts to form end pieces for the HEPA filter, cutting two other pieces of extrusion to equal lengths with 45° cuts to form side pieces for the HEPA filter, inserting the corner joining clips into the rectangular slots at the ends of one of said side pieces, the rectangular slots of two end pieces are then inserted onto the corner joining clips in the end piece to form a U shape wall, the protective screen and the filter media are slid into the U shape, the filter media is sealed to the base of the extrusion, further joining clips are inserted into the rectangular slots of the remaining side piece, the open ends of the joining clips are inserted in the rectangular slots of the end pieces of the U shaped wall to complete the HEPA filter assembly.

DESCRIPTION OF THE PREFERRED EMBODIMENTS

Figure 1:
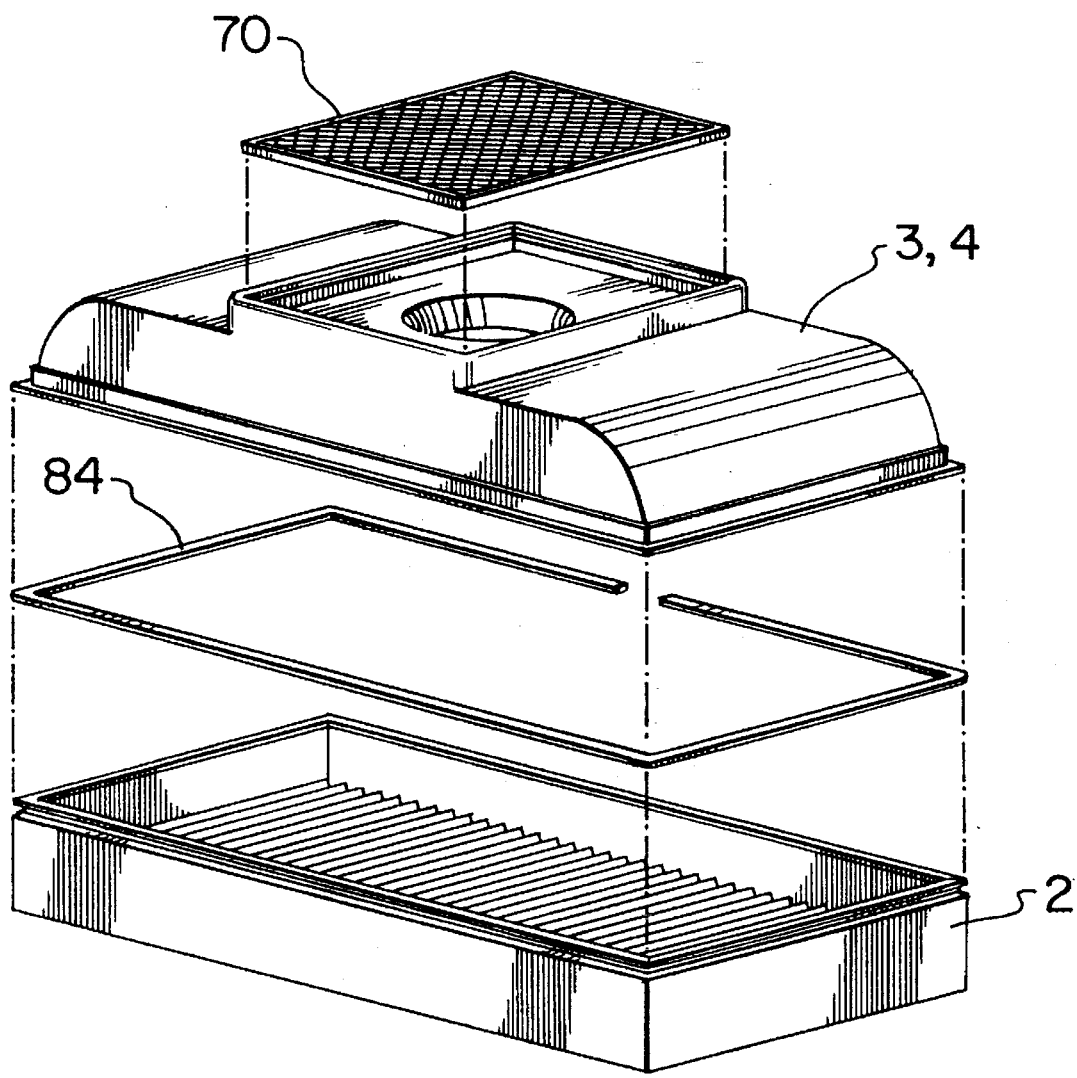
FIG. 1 is an exploded view of the fan shroud assembly with pre filter on the top of the fan shroud assembly, the HEPA filter assembly and the fastening means for fastening the fan shroud assembly and the HEPA filter assembly together.
Figure 5:
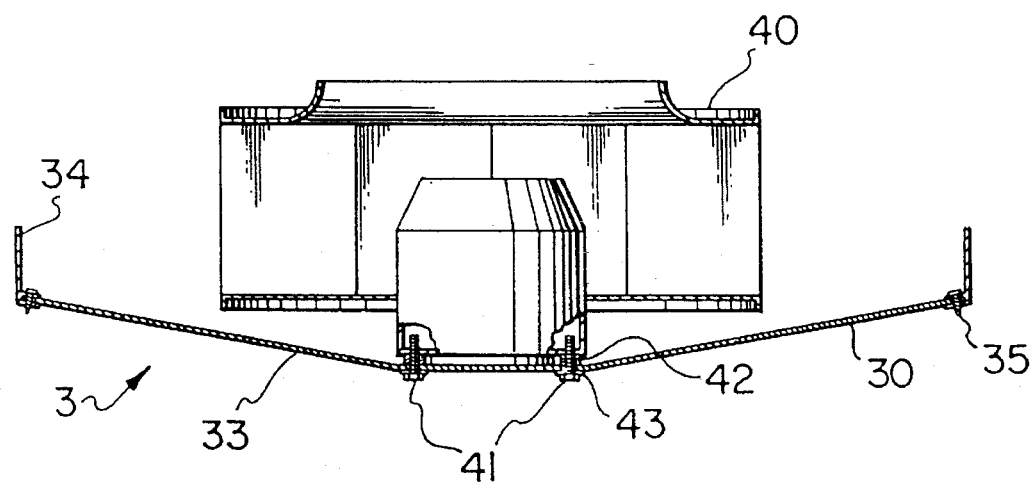
FIG. 5 is a sectional view of the fan mount assembly along Section 5—5 of FIG. 4.

Referring to FIGS. 1 and 5, the fan filter module 1 is comprised of three major assemblies: the HEPA filter assembly 2, the fan mount assembly 3 and the fan shroud assembly 4.

Figure 2:
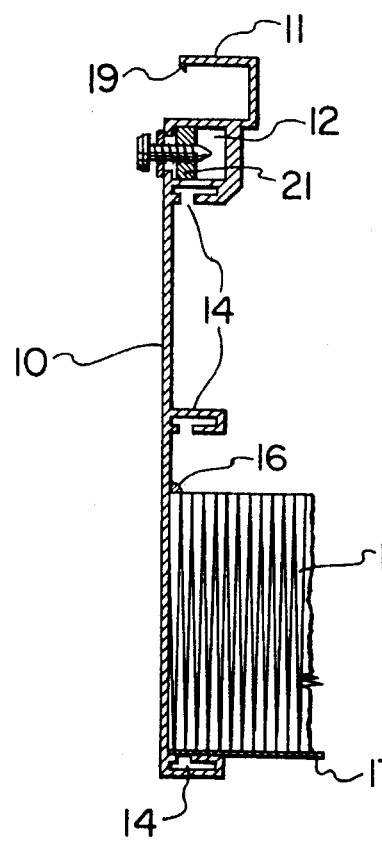
FIG. 2 is a section through the extrusion forming the walls of the HEPA filter assembly showing a square slot with fastener used mainly in suspension applications. The media of the HEPA filter rests on the rectangular slot at the base of the extrusion.
Figure 3:
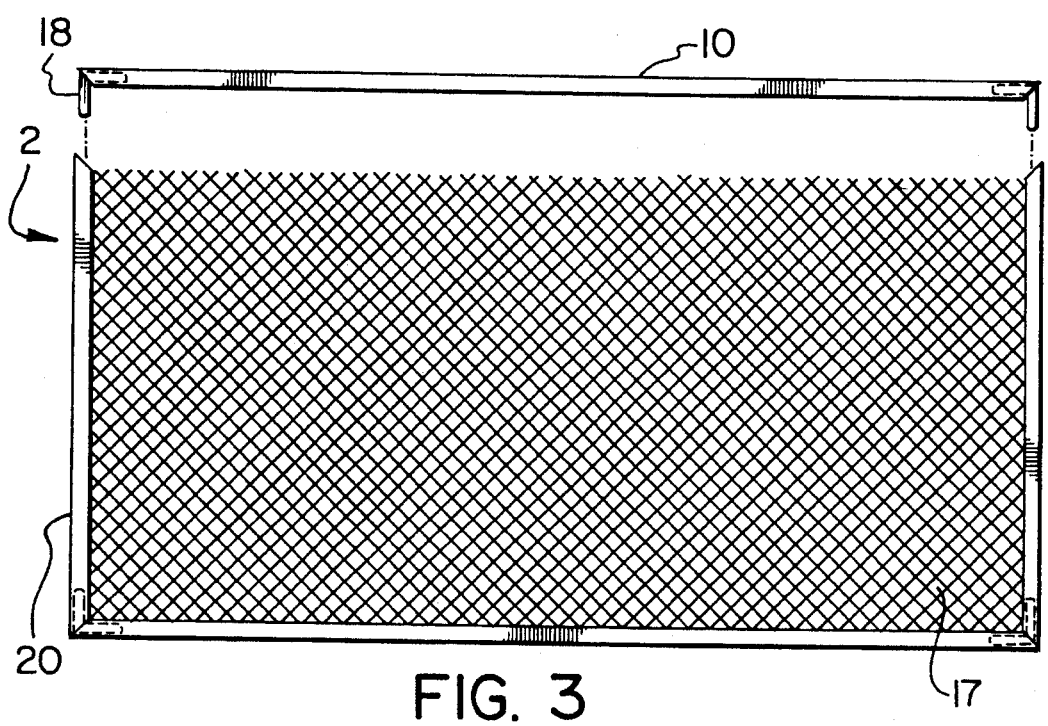
FIG. 3 is a plan view of the HEPA filter assembly partially assembled.

As seen in FIGS. 2 and 3, the HEPA filter assembly 2 consists of an aluminum extrusion 10, filter media 15 and a protective screen 17.

The aluminum extrusion 10 has a lip 11 around the top to provide a sealing edge for the fan shroud assembly 4. The lip 11 has a barb 19 which helps to secure the vinyl fastening channel 84 to the aluminum extrusion 10. A square slot 12 accepts a square nut 21, a nylon grommet, or a hold-down clamp to allow the fan filter module 1 to be secured in any plane. The square nut 21 is used mainly in suspension applications. Three rectangular slots 14 accept corner joining clips 18 enabling pieces of aluminum extrusion 10 to be joined at 90° relative to one another to form the walls of the HEPA filter assembly 2.

The filter media 15 is a non-flammable, water repellant microglass paper folded into pleats to form a pack. A protective screen 17 is epoxy coated and installed downstream of the filter media 15.

As seen in FIG. 3, the HEPA filter assembly 2 is constructed by the following method. Two sides and two end pieces of the aluminum extrusion 10 are cut to length with a 45° cut. Corner joining clips 18 are inserted into rectangular slots 14 of one of the side pieces. Two end pieces are then inserted onto the corner joining clips 18 to form a "U" shape 20. The protective screen 17 and filter media 15 are slid into the "U" shape 20. Corner joining clips 18 are installed into the remaining side piece and into the "U" shape 20 to complete the assembly. The assembly is placed on one of its edges and a urethane adhesive 16 is poured in to bond the filter media 15 to the aluminum extrusion 10. Once the urethane adhesive 16 has hardened, the process is repeated for the remaining three sides.

Figure 4:
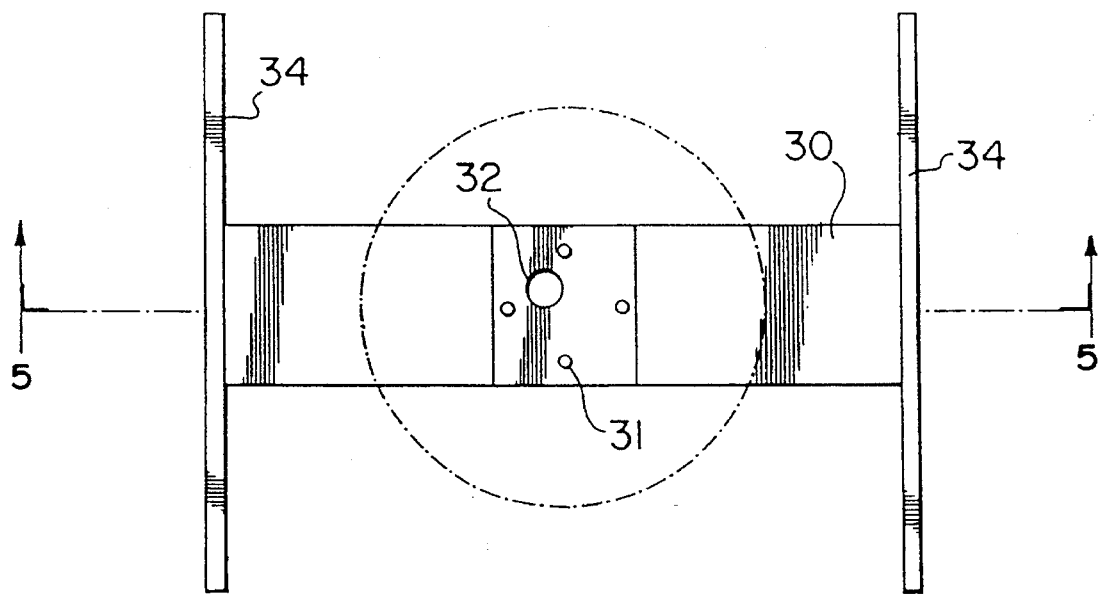
FIG. 4 is a plan view of the fan mount assembly.

As seen in FIGS. 4 and 5, the fan mount assembly 3 consists of a narrow thin fan mount plate 30, fan/motor 40 and two side support rails 34.

The fan mount plate 30 is fabricated out of aluminum. Two sloping sides 33 add strength and allow the fan/motor 40 to be mounted so that the fan is disposed below the air inlet. Four mounting holes 31 set the correct location of the fan/motor 40. The power supply route to the fan/motor 40 is achieved through a hole 32 in the fan mount plate 30. Two side support rails 34 substantially the same length as the shroud, extruded out of aluminum, secure the fan mount plate 30 to the base of the fan shroud 60.

Figure 6:
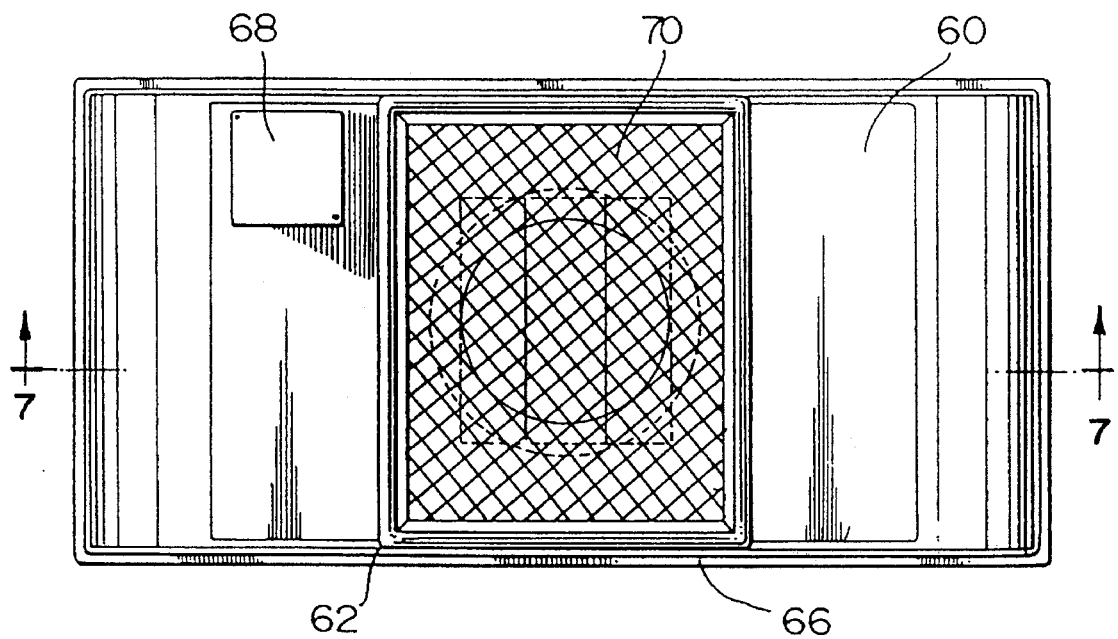
FIG. 6 is a plan view of the fan shroud assembly.
Figure 7:
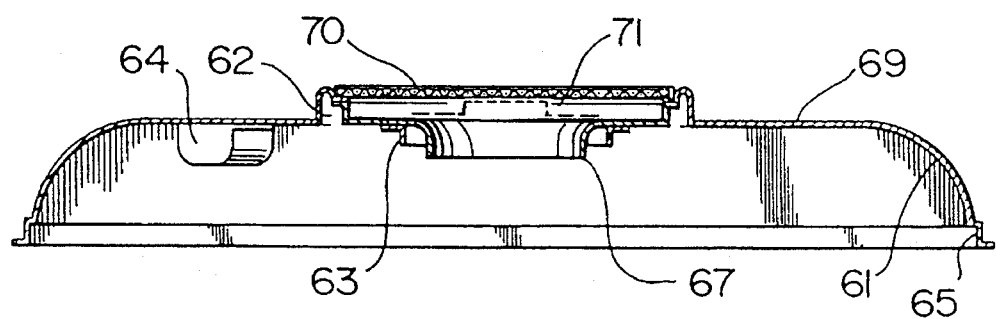
FIG. 7 is a sectional elevation view of the fan shroud assembly taken along Section 7—7 of FIG. 6.
Figure 8:
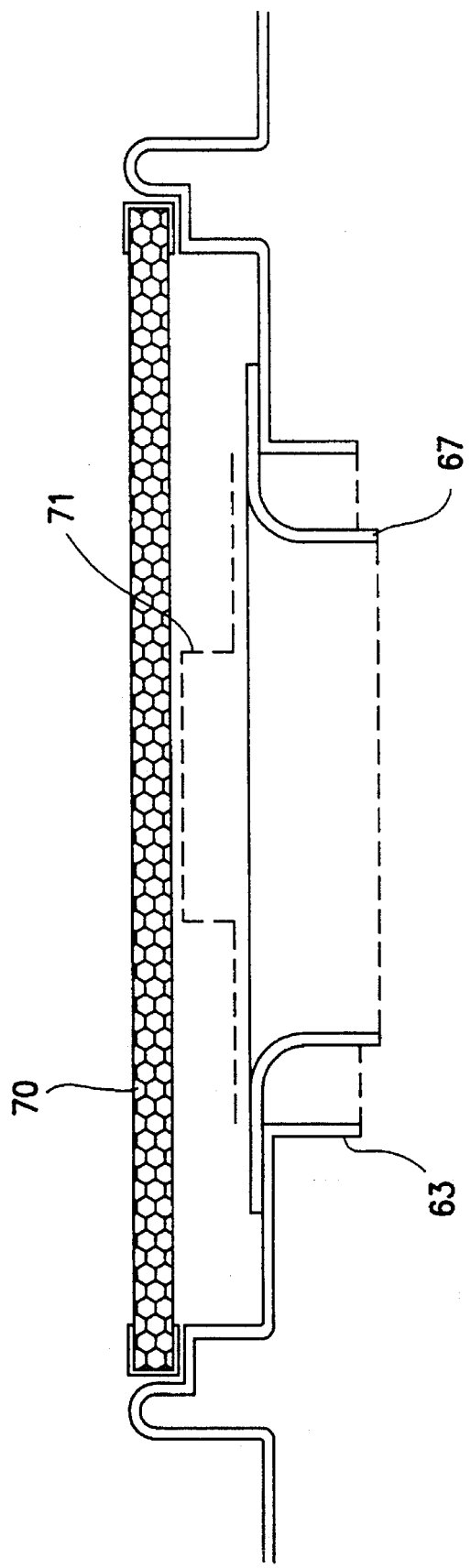
FIG. 8 is blown-up sectional view of a portion of the fan shroud assembly depicted in FIG. 7.

The fan shroud assembly 4 as shown in FIGS. 6 and 7 consists of a fan shroud 60, an inlet ring 67, a prefilter 70, an electrical cover plate 68 and an inlet guard 71.

The fan shroud 60 is vacuum-formed out of fire retardant acrylic PVC. The inside of the fan shroud is covered with a flexible urethane foam structure having a pressure sensitive adhesive backing for easy installation. A flexible urethane foam structure with an embossed surface provides sound damping. Two inclined or curved ends 61 direct the airflow downwards. An offset 65 around all four sides acts both as a mounting surface, and a location for the fan mount/deflector assembly 3. Offset ribs 62 along the top of the fan shroud 60 provide strength as well as a pre-filter 70 support. An electrical box 64 is moulded into the fan shroud 60 to enclose speed control, motor capacitor and electrical connections. A round lip/recess 63 in the center of the fan shroud 60 provides strength and location for the inlet ring 67. A flat lip 66 around the perimeter provides a support and sealing edge for the HEPA filter assembly 2.

An electrical cover plate 68 made out of the same material as the fan shroud 60 encloses the electrical box 64. An inlet ring 67 moulded out of the same material as the fan shroud mounts into the round lip/recess 63. The inlet ring 67 is adjustable so that it can be centered on the fan/motor 40. An inlet guard 71 made out of expanded aluminum serves two purposes: (a) it protects users from moving parts, and (b) it stops the pre-filter 70 from collapsing which could result in reduced air volumes.

The fan filter module 1 is assembled as follows. Mount fan/motor 40 to fan mount plate 30 with four bolts 41, four spacers 42, and four washers 43. Install nylon wire clips to secure the fan/motor wire to fan mount plate 30. Fit side support rails 34 to fan mount plate 30 and secure with two screws 35 per side. Place fan shroud 60 upside-down. Flip the fan mount assembly upside-down onto fan shroud 60 and feed fan/motor wire into electrical box 64. Drill holes in each side and install nylon fasteners. Turn the fan shroud assembly and fan mount assembly right side-up and position it onto the HEPA filter assembly 2. Starting from the back/center, install the vinyl fastening channel 84, mitering the corners. Center the inlet ring 67 on fan/motor 40 and fasten with screws. Fasten the protective guard 71 above inlet ring 67 with four screws. Stick male and female velcro pieces to pre-filter 70 and fan shroud 60 respectively. Install the capacitor and power cord in electrical box 64, and wire up connections, fasten electrical cover plate 68 to fan shroud 60 with screws.

In operation exterior air is drawn into the clean air fan filter module through the pre-filter 70 and inlet ring 67 by the fan/motor 40. The air is displaced radially towards the two curved ends 61 of the fan shroud which directs airflow downwardly through the filter media 15 of the HEPA filter assembly 4.

I claim:

1. A clean air fan filter module without a physical damper or intermediate baffle assembly comprising:

a fan shroud having an air inlet, an air inlet ring having horizontal flanges which sit on said fan shroud and vertical interior walls extending through said air inlet, said ring moveable relative to said air inlet, a pre-filter, two inclined ends, and a planar top surface having formed therein, offset ribs with four sides extending about said air inlet, said ribs including means to receive and support said pre-filter;

a fan/motor mount;

a centrifugal fan blowing air radially toward the fan shroud;

a fan and motor mounted on said fan/motor mount below said air inlet at a level entirely below said shroud top planar surface; and, a HEPA filter serving as an air outlet.

2. The clean air fan filter module of claim 1 in which the fan shroud has two curved ends with curves extending downwardly substantially through ninety degrees.

3. The clean air fan filter module of claim 1 in which the fan shroud is vacuum-formed.

4. The clean air fan filter module of claim 1 having four sides in which the fan/motor mount is comprised of a thin plate fastened to two sides of the fan filter module.

5. The clean air fan filter module of claim 4 in which the HEPA filter is fastened to the bottom of the side walls of the clean air filter module.

6. A clean air fan filter module comprising:

a fan shroud assembly having an air inlet, a prefilter, a planar top surface having curved ends to direct airflow downwardly, offset ribs formed in said planar top surface having four sides extending about said air inlet, said ribs further including means to receive and support said pre-filter, an air inlet ring having horizontal flanges supported by said fan shroud assembly and vertical interior walls extending through said air inlet, said ring movable relative to said air inlet such that said air inlet ring may be aligned with respect to said inlet;

a fan mount assembly, a HEPA filter assembly for air outlet, means for fastening the fan mount assembly and fan shroud assembly together and means for fastening a top portion of the HEPA filter assembly to a bottom portion of the fan shroud assembly to form a clean air fan filter module.

7. The clean air fan filter module of claim 6 in which the air inlet is positioned in the top of the fan shroud assembly.

8. The clean air fan filter module of claim 6, in which the fan shroud assembly is vacuum-formed.

9. The clean air fan filter module of claim 6 in which the base of the fan shroud is generally rectangular in shape, the lower side walls of the fan shroud having offset ribs extending into a flat lip around the perimeter of the fan shroud.

10. The clean air fan filter module of claim 6 in which said fan mount assembly includes a centrifugal fan for blowing air radially outwardly, said fan attached to a fan mount plate, and said fan mount plate being fastened to the fan shroud assembly.

11. The clean air fan filter module of claim 6 in which the fan mount assembly is comprised of a centrifugal fan for blowing air radially outwardly, a fan mount plate and two side support rails, the centrifugal fan being fastened to the fan mount plate, the side rails being fastened to the sides of the fan shroud assembly, the fan mount plate being fastened to the side support rails and sides of the fan shroud assembly.

12. The clean air fan filter module of claim 6 in which the HEPA filter assembly is comprised of side walls, filter media within said side walls and a protective screen below the filter media.

13. The clean air fan filter module of claim 12 in which the side walls of the HEPA filter assembly are formed from an extruded metal or plastic.

14. A damper-less, clean air fan filter module which does not require an intermediate baffle comprising:

a fan shroud having a planar top surface which transitions into curved ends extending downwardly substantially through ninety degrees;

a pre-filter;

an air inlet formed in said shroud planar top surface;

a centrifugal fan and fan motor for blowing air radially towards said shroud curved ends;

offset ribs having four sides formed in said shroud top planar surface about said air inlet, said ribs further having a top surface having means to receive and support said pre-filter;

an air inlet ring having horizontal flanges supported by said fan shroud and vertical interior walls extending through said air inlet, said air inlet ring moveable with respect to said air inlet allowing alignment over said centrifugal fan;

means for mounting said centrifugal fan and fan motor to said shroud underneath said air inlet, said fan and fan motor positioned entirely below said shroud planar top surface; and, an air outlet comprising a HEPA filter assembly attached to said fan shroud.

15. The damper-less, clean air fan filter module of claim 14 in which said fan shroud is vacuum-formed.

\* \* \* \* \*